Nov. 29, 1938.  O. A. CHRISTENSON  2,138,267

TRAILER HITCH

Filed Dec. 19, 1936

Inventor
O. A. Christenson
by Orwig & Hague Attys

Patented Nov. 29, 1938

2,138,267

UNITED STATES PATENT OFFICE 2,138,267

TRAILER HITCH

Olaf A. Christenson, Albert City, Iowa

Application December 19, 1936, Serial No. 116,721

9 Claims. (Cl. 188—142)

This invention relates to trailer hitches particularly of that type employing mechanism for automatically controlling and operating the brakes carried by the trailer, by a force created by the momentum of the trailer at such times as the speed of the car to which the trailer is attached is reduced relative to the speed of the trailer.

I am aware that numerous trailer hitches have been patented having means whereby the brakes for the trailer will be automatically set on forward movement of the trailer relative to the car to which it is attached. Insofar as I am aware, however, none of these devices employs energy storing means, such as a spring under strain, for automatically setting the brakes at times when the trailer is accidentally disconnected from the car to which it is connected, or whereby the stored energy may be released manually for setting the brakes when the trailer is to be raised.

It is, therefore, the object of my invention to provide a trailer hitch of simple, durable and inexpensive construction having energy storing means wherein the brakes of the trailer supporting the hitch will be automatically set upon the energy of said storing means being released by the hitch becoming accidentally disconnected from its mobile support or upon being manually released.

A further object of my invention is to provide in a trailer hitch of the type above described, means for automatically energizing the energy storing means by force being applied to the trailer draw bar for advancing the trailer.

A further object of my invention is to provide in a trailer hitch of the type above described means for locking the brake operating mechanism against operation at such times when backward force is being applied to the trailer draw bar.

A further object of my invention is to provide in a trailer hitch employing means controlled by the movement of the draw bar relative to the trailer frame for automatically setting the trailer brakes and employing in connection therewith a fluid cylinder for controlling the brake mechanism, and means for positively connecting the piston of the braking cylinder to the draw bar, adjustable means for limiting the movement of the draw bar in one direction.

A further object is to provide in a trailer hitch of the type above described employing an energy storing device for automatically setting the trailer brakes, means for latching the energy storing device in inoperative relation with the brake mechanism, and in connection therewith means actuated upon the accidental disconnection of the trailer from its mobile support for releasing said energy storing means.

My invention consists in the construction, arrangement and combination of the various parts of the device, whereby the objects contemplated are attained, as hereinafter more fully set forth, pointed out in my claims, and illustrated in the accompanying drawing, in which:

Figure 3:
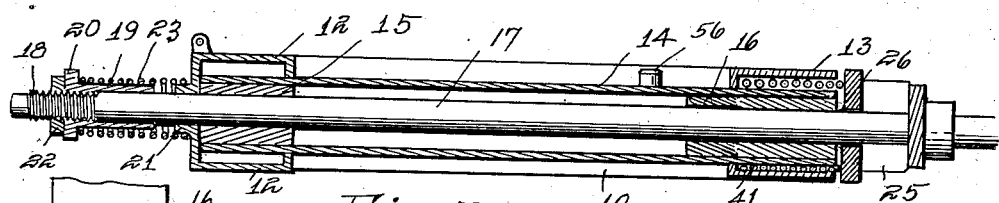
Figure 3 is an enlarged sectional view taken on the line 3—3 of Figure 1.
Figure 4:
Figure 4 is a detail sectional view taken on the line 4—4 of Figure 2, with the spring for automatically operating the brake in a released and operative condition.
Figure 1:
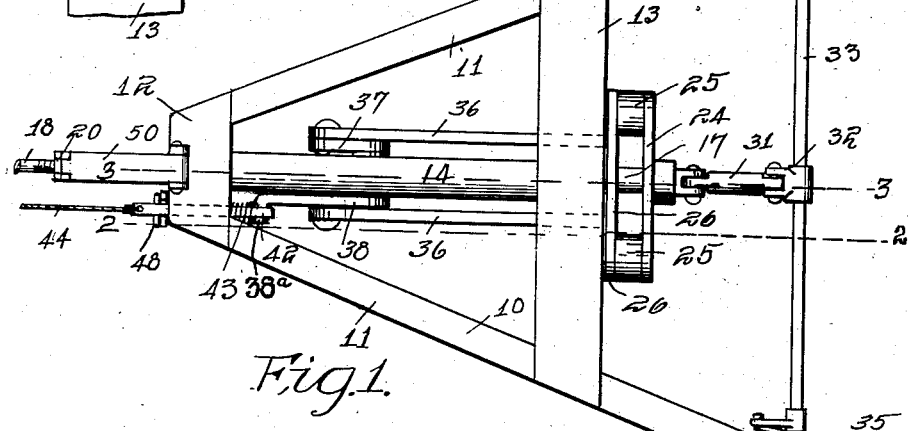
Figure 1 is a plan view of my improved trailer hitch as applied to the forward end of a trailer frame.

In the drawing I have used the reference numeral 10 to indicate the forward end of a trailer frame having converging side members 11 connected to a hollow tubular end member 12 of rectangular cross section, the frame members 11 also being provided with a rectangular tubular frame member 13, said members 12 and 13 being connected by a central longitudinally extending tube 14, the rear end of the tube extending through the member 13, as illustrated in Figure 3, and the forward end of said member 14 extending through the member 12. The forward end of the member 14 is provided with a bearing 15, while a bearing 16 is provided in the member 14 near its rear end, said bearings 15 and 16 being designed to slidably support a draw bar 17. The forward end of the draw bar 17 has a threaded portion 18 for supporting an internally threaded sleeve 19, the forward end of the sleeve 19 being provided with a head 20. Means is thus provided for limiting the rearward movement of the draw bar by the engagement of the rear end of the sleeve 19 with the forwardly extending portions 21 formed on the front side of the member 12. A nut 22 is provided for locking the sleeve 19 in any of its adjusted positions.

Supported around the sleeve 19 is a spring 23 for controlling the rearward movement of the said draw bar 17. Fixed to the rear end of the draw bar 17 is a transversely arranged bar 24 having at each end a rubber cushion 25 adapted to rest against the rear face of a yoke 26 slidably mounted on the shaft 17 and adapted to engage the back face of the member 13 when forward movement is imparted to the bar 17 by means of a hitch device 27 carried by the forward end of the bar 17, said device being adapted to be operated with a corresponding hitch element 28 carried by the automobile frame 29, thus providing means whereby forward movement may be imparted to the trailer frame 10, and at the same time providing means for cushioning the draft of the trailer and eliminating a large amount of noise that would otherwise be produced in the trailer frame due to the vibration set up in the draft device due to forward and rearward surging action produced as the trailer is advanced over the road surface.

The rear end of the draw bar 17 is pivotally connected to a link 31, which in turn is pivotally connected to a rock arm 32 supported on the rock shaft 33 carried by the frame members 11, the shaft 33 being provided with rock arms 34 to which the brake operating rods 35 are connected, said rods being of the usual construction and designed to operate the brake mechanism carried by the trailer supporting wheels in the usual manner, the brakes being set upon rearward movement of the bar 17 and released upon forward movement of said bar.

For automatically setting the brakes in case the trailer is accidentally disconnected from its mobile support, I have provided the following mechanism: The yoke 26 is provided with a pair of forwardly projecting rods 36 having their forward ends pivotally connected to a rock arm 37 and a lever 38 provided with a laterally extending portion 38a at its free end, said rock arm and lever being fixed to a shaft 39 rotatably supported in a bearing member 40 carried by the under surface of the member 14. A spring 41 is supported around the rear end of the tubular member 18 and having its forward end resting against the frame 13 and its rear end against the yoke 26, so arranged that as the spring 41 is expanded, the yoke 26 will be moved rearwardly and to carry with it the cushions 25 and the member 24, causing the bar 17 to be moved rearwardly, and the brake mechanism set. If forward force is applied to the bar 17, then the yoke 26 will be moved forwardly and the spring 41 will be compressed. The lever 38 will then be moved forwardly and have the member 38a engage a latch bar 42 slidably mounted in the frame member 12, thus locking the spring under strain and to an inoperative relation with the cushions 25. A spring 43 is mounted on the bar 42 for forcing the said bar rearwardly to locking position. A rope 44 or other breakable device has one end connected to the forward end of the bar 42 and its opposite end designed to be connected to the frame of the car or mobile support in such a manner that if the coupling device 28 should accidentally become broken or the trailer otherwise accidentally disconnected, then tension will be applied to the rope, causing the latch bar 42 to disengage the portion 38a, allowing the free end of the lever 38 to swing upwardly and rearwardly and the yoke 26 to move rearwardly by tension of the spring 41, thus causing the brakes to be automatically set in the manner above described. Further movement of the car relative to the trailer will cause the rope to be broken.

The bottom side of the frame member 12 is provided with downwardly extending lugs 45 for pivotally receiving a lever 46, one end of which is provided with a forked portion 47 designed to engage a pin 48. The opposite end of the lever is designed to incline downwardly and rearwardly, and thence upwardly and rearwardly to form a shoe 48a in such a manner that if the front end of the frame 10 should be dropped to the ground surface the lever 46 will engage the ground surface causing the member 47 to be moved forwardly and engage the pin 48, releasing the latch bar 42, thus providing means whereby the brakes may be automatically set. In case the operator fails to connect the rope 44 in proper manner, or in case the said rope should break without actuating the bar 42, the brakes will be set upon the forward end of the frame being dropped and the lever 46 engaging the ground surface. Said lever is provided with a rearwardly and upwardly extending portion so as to enable the end of the lever to slide over the ground surface when the trailer is traveling either forwardly or rearwardly, without interfering with its operation.

Figure 2:
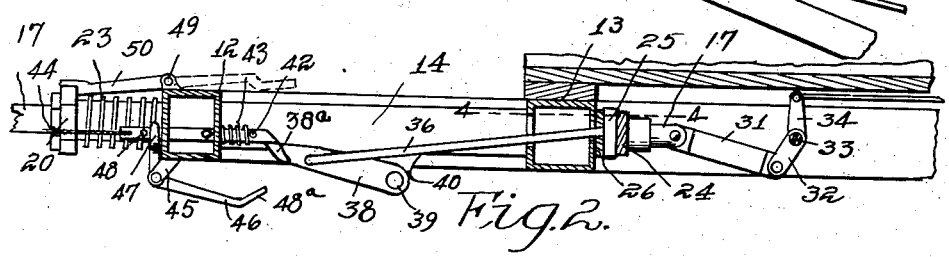
Figure 2 is a detail sectional view taken on the line 2—2 of Figure 1.

The top of the frame member 12 is provided with a hinge device 49 for supporting a lock bar 50, having its free end designed to engage the nut 20, and when so engaged, to lock the bar 17 against rearward movement and against the brakes being set, thus providing means whereby the operator may lock the device to an inoperative condition to permit the trailer to be backed, if so desired. When not in use, the bar 50 is swung to the dotted line position, as illustrated in Figure 2.

The lever 46 also provides means for manually releasing the spring 41 simply by grasping the free end of said bar and elevating the same, thus enabling the operator to set the trailer brakes any time that he so desires. The spring 41 will again be set to an inoperative position upon imparting forward movement to the bar 17, thus providing means whereby the spring 41 will be automatically set.

It will readily be seen that various devices might be substituted for the spring 41, such, for instance, as an air cylinder, and for that reason in the claims I have substituted the term "energy storing means" for spring.

Figure 5:
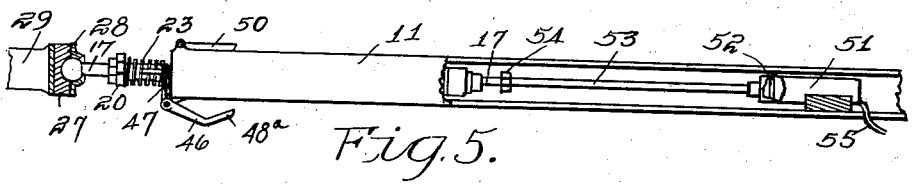
Figure 5 is a side elevation of the forward end of a trailer frame having a portion of one side broken away to illustrate a modified form of my device in which a fluid cylinder is employed for setting the brake.

In Figure 5 I have illustrated a somewhat modified form in which there is a fluid cylinder 51 having a piston 52 and a piston rod 53, the piston rod being connected directly to the bar 17 by means of a coupling device 54, thus providing means whereby the fluid in the cylinder 51 may be placed under pressure as the bar 17 is moved rearwardly and the brakes of the trailer set by means of mechanism now in common use, commonly known as hydraulic brakes, a tube 55 being employed for connecting the cylinder 51 with said brake mechanism. When the brake mechanism is employed using the fluid cylinder, it is quite essential that means be provided for limiting the rearward movement of the bar 17. For this reason the sleeve 19 before described has been provided, said sleeve being adjustable so as to be supported on the bar 17 so that the movement of the piston may be limited to prevent injury to the brake mechanism which might happen in case a non-compressible fluid is employed in the cylinder, such as oil. The spring 23 serves to act as a means for preventing free sliding movement of the bar 17 when either type of the brake mechanism is employed, and serves as a means for automatically releasing the brake mechanism.

The tubular member 14 may be filled with grease through a cup 56 so that the bearings of the bar 17 may at all times be properly lubricated.

Therefore, it will be seen I have provided a trailer hitch of comparatively simple construction which is reliable in its operation and in which the brakes may be automatically set in case the trailer becomes accidentally disconnected from its support, and means enabling the operator to manually set the brakes at any time when so desired, for instance, when the trailer is not in use, thus eliminating the necessity of providing chocks. By providing the cushions 25 I have provided means whereby excessive noises are reduced and wherein more steady and uniform motion is imparted to the trailer.

I claim as my invention:

1. A trailer hitch comprising a frame, a draw bar slidably mounted therein adapted to be connected to a mobile support, means operatively connecting said draw bar to the brake mechanism of a trailer whereby the brakes of the trailer will be set upon rearward movement of said draw bar relative to said frame, yieldable means for applying rearward movement to said draw bar, means for latching said yieldable means inactive under strain, and means actuated by engagement with the ground surface by dropping said frame, for releasing said latching means whereby the trailer brakes will be automatically set.

2. A trailer hitch comprising a frame, a draw bar slidably mounted therein adapted to be connected to a mobile support, means operatively connecting said draw bar to the brake mechanism of a trailer whereby the brakes of the trailer will be set upon rearward movement of said draw bar relative to said frame, yieldable means for applying rearward movement to said draw bar, means for latching said yieldable means inactive under strain, and means actuated by accidental disconnections between said draw bar and mobile support, for releasing said latching means.

3. A trailer hitch comprising a frame, a draw bar slidably mounted therein adapted to be connected to a mobile support, means operatively connecting said draw bar to the brake mechanism of a trailer whereby the brakes of the trailer will be set upon rearward movement of said draw bar relative to said frame, yieldable means for applying rearward movement to said draw bar, means for latching said yieldable means inactive under strain, means actuated by accidental disconnection between said draw bar and mobile support, for releasing said latching means, and means actuated by a forward movement of said draw bar relative to said frame for latching said yieldable means under operative strain.

4. A trailer hitch comprising a frame, a draw bar slidably mounted therein adapted to be connected to a mobile support, means operatively connecting said draw bar to the brake mechanism of a trailer whereby the brakes of the trailer will be set upon rearward movement of said draw bar relative to said frame, yieldable means for moving said draw bar rearwardly, means for latching the last yieldable means under operative strains and in inoperative relation with said draw bar, and means for releasing said latching means.

5. A trailer hitch comprising a frame, a draw bar having at one end means for attaching the draw bar to a mobile support and at the other end means operatively connecting the draw bar to a brake mechanism, cushioning means for limiting the forward movement of said draw bar, yieldable means for imparting rearward movement to said draw bar, means for latching said yieldable means under operative strain and in inoperative relation with said draw bar, and means for releasing said latching means when the draw bar becomes disconnected from its mobile support.

6. A trailer hitch comprising a frame, a draw bar slidably mounted therein, a fluid cylinder for operating brake mechanism, a piston in said cylinder, means for connecting said draw bar directly to the piston of the fluid cylinder, yieldable means tending to move said draw bar forwardly, and adjustable means for limiting the rearward movement of said draw bar.

7. A trailer hitch comprising a frame, a draw bar slidably mounted therein, a fluid cylinder for operating brake mechanism, a piston in said cylinder, means for connecting said draw bar directly to the piston of the fluid cylinder, yieldable means tending to move said draw bar forwardly, adjustable means for limiting the rearward movement of said draw bar, and means for locking the draw bar against rearward movement.

8. A trailer hitch, comprising a frame, a draft element carried by said frame mounted to move forwardly and rearwardly relative to said frame and adapted to be connected to a mobile support, means operatively connecting said draft element to the brake mechanism of a trailer whereby said brakes will be set on rearward movement of said draft element relative to said frame, yieldable means carried by said frame for imparting rearward movement to said draft element, means for latching said yieldable means inactive under strain, and means actuated by accidental disconnection between said draft device and mobile support for releasing said latching means.

9. A trailer hitch comprising a frame, a draw bar slidably mounted therein adapted to be connected to a mobile support, means operatively connecting said draw bar to the brake mechanism of a trailer whereby the brakes of the trailer will be set upon rearward movement of said draw bar relative to said frame, yieldable means for moving said draw bar rearwardly, means for latching the last yieldable means under operative strain and in inoperative relation with said draw bar, means for releasing said latching means, and means for latching said draw bar against rearward movement relative to said frame.

OLAF A. CHRISTENSON.